United States Patent [19]

van Meerbergen et al.

[11] Patent Number: 4,730,266
[45] Date of Patent: Mar. 8, 1988

[54] LOGIC FULL ADDER CIRCUIT

[75] Inventors: Jozef L. van Meerbergen; Hendrikus J. M. Veendrick; Franciscus P. J. M. Welten; Franciscus J. A. van Wijk, all of Eindhoven, Netherlands

[73] Assignee: U.S. Philips Corporation, New York, N.Y.

[21] Appl. No.: 698,055

[22] Filed: Feb. 4, 1985

[30] Foreign Application Priority Data

Feb. 9, 1984 [NL] Netherlands ............... 8400408

[51] Int. Cl.[4] ............... G05F 7/50; H01L 27/02
[52] U.S. Cl. ............... 364/787; 364/784; 364/786; 357/41
[58] Field of Search ............... 364/784, 786, 787, 788, 364/785; 307/445, 451; 357/40–42

[56] References Cited

U.S. PATENT DOCUMENTS

| | | | |
|---|---|---|---|
| 3,932,734 | 1/1976 | Parsons | 364/786 |
| 4,052,604 | 10/1977 | Maitland et al. | 364/786 |
| 4,384,287 | 5/1983 | Sakuma | 307/451 |
| 4,417,314 | 11/1983 | Best | 364/785 |
| 4,425,623 | 1/1984 | Russell | 364/787 |
| 4,441,158 | 4/1984 | Kanuma | 364/786 |
| 4,464,729 | 8/1984 | Mlynek | 364/787 |
| 4,504,924 | 3/1985 | Cook et al. | 364/787 |
| 4,564,921 | 1/1986 | Suganuma | 364/784 |

Primary Examiner—Gary V. Harkcom
Assistant Examiner—Long Thanh Nguyen
Attorney, Agent, or Firm—Thomas A. Briody; Jack Oisher; William J. Streeter

[57] ABSTRACT

A logic circuit incorporating carry look-ahead in which efficiency can be achieved regarding the hardware for generating the sum signals and carry signals by a suitable choice of the adder gate, making use of the already present signal $\overline{a_i \cdot b_i}$ which is used for generating the carry look-ahead signal.

8 Claims, 3 Drawing Figures

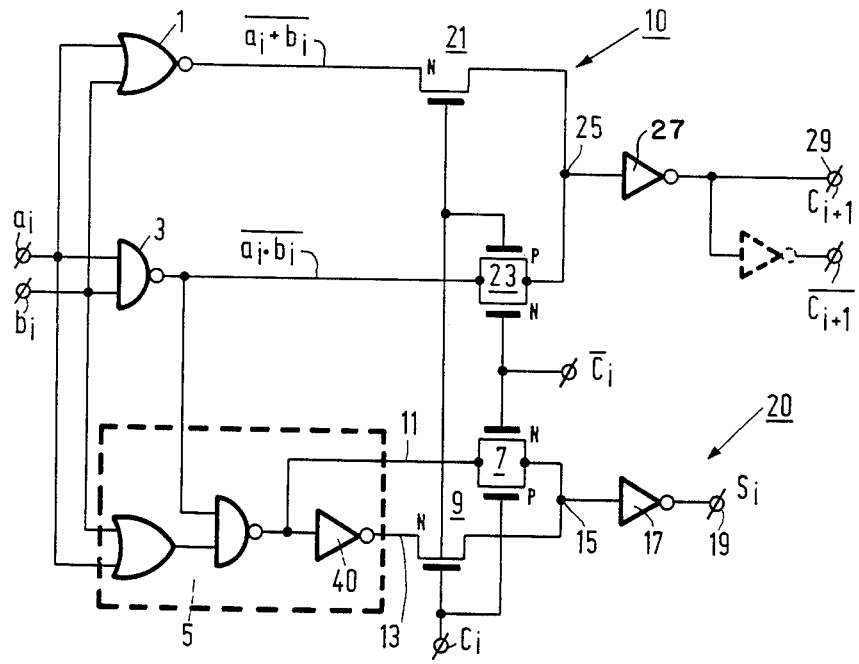
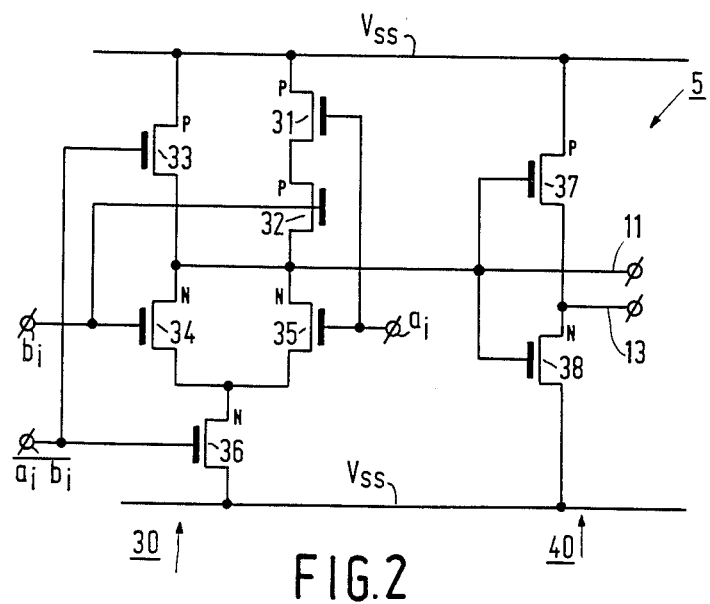
FIG.1
FIG.2

LOGIC FULL ADDER CIRCUIT

BACKGROUND OF THE INVENTION

The invention relates to a logic full-adder circuit for adding two binary numbers a and b which each consist of n bits, n being a natural number larger than or equal to 2. The full adder comprises an inverting OR-gate and an inverting AND-gate for each bit $a_i$, $b_i$ of the numbers a and b, where $0 \leq i \leq n$, said gates receiving the bit signals $a_i$ and $b_i$ in order to form an inverted OR-signal $\overline{a_i + b_i}$ and an inverted AND-signal $\overline{a_i \cdot b_i}$.

A summing circuit forms a sum signal $s_i$ from the bit signals $a_i$ and $b_i$ and an associated carry signal $c_i$ and/or the inverse $\overline{c_i}$ thereof. The full-adder circuit also comprises a carry look-ahead signal circuit for generating a carry look-ahead signal $c_{n+1}$ having the significance $n+1$ from all inverted OR-signals and AND-signals $\overline{a_i + b_i}$ and $\overline{a_i \cdot b_i}$ where $0 \leq i \leq n$.

Such full-adder circuits are marketed in the form of integrated circuits by various firms, for example Signetics type SN 7483 or Motorola type MC14008. These circuits utilize the principle of forming a carry look-ahead signal from the carry signals produced during the various additions of bits of ascending significance. The carry look-ahead signal has the correct logic value for being applied to the adder gates of the bits of higher significance than the next-higher significance. If the bits of ascending significance of the signals a and b are successively denoted as $a_0$, $a_1$, $a_2$ etc. and $b_0$, $b_1$, $b_2$ etc. the carry signal $c_1$ would, before the introduction of the carry look-ahead principle, have been formed from the addition $a_0 + b_b$, said carry signal being applied to the adder gate of the signals $a_1$ and $b_1$, the carry signal $c_2$ formed during this addition being subsequently applied to the adder gate of the signals $a_2$ and $b_2$ etc. so that the addition in the $n^{th}$ gate of the signals $a_n$ and $b_n$ could not be started before completion of the additions in all preceding gates. By generating the carry look-ahead signal $c_n$ in advance in some other way in accordance with the carry look-ahead principle, the speed of calculation can be substantially increased.

To this end, the known circuits utilize a separate arithmetic unit containing a truth table such that when the signals $a_0$, $a_1 \ldots a_{n-1}$ and $b_0$, $b_1$, $\ldots b_{n-1}$ are inputted, the output directly supplies the carry look-ahead signal $c_n$. In order to generate the carry look-ahead signal, the signals $\overline{a_i + b_i}$ and $\overline{a_i \cdot b_i}$ are generated by means of inverting OR-gates and AND-gates. In addition to this carry look-ahead signal circuit, a full-adder circuit comprise, for each bit of a binary number to be added, a summing circuit for generating a sum signal and a carry circuit for generating a carry signal which is required for obtaining the desired higher-order sum signal. It will be apparent that a substantial number of logic gates is required for this purpose.

SUMMARY OF THE INVENTION

It is the object of the invention to provide a full-adder circuit in which the number of logic gates and the number of components (transistors) in these gates can be substantially reduced whilst the result of the addition can become available sooner because the number of delay times has been reduced.

To this end, a full-adder circuit in accordance with the invention is characterized in that each summing circuit comprises a logic gate which receives the bit signals $a_i$ and $b_i$ and the inverted AND-signal $\overline{a_i \cdot b_i}$ in order to form a logic signal $\overline{a_i \cdot b_i} \cdot (a_i + b_i)$ on a first output thereof and the inverted logic signal $\overline{\overline{a_i \cdot b_i} \cdot (a_i + b_i)}$ on a second output thereof, and also comprises electronic switches which connect, under the control of the carry signal $c_i$ and/or the inverse $\overline{c_i}$ thereof, either the first output or the second output of the logic gate to a first junction in order to generate an inverted sum signal $\overline{s_i}$ on the first junction.

In addition to the OR-gate and AND-gate already present for the carry look-ahead signal, a full-adder circuit in accordance with the invention may comprise, for each bit of a binary number to be added, only one further logic gate (which needs to comprise only eight transistors in the CMOS transistor technique) and some electronic switches (each of which can comprise, as is known, a field-effect transistor or e.g. in the CMOS technique a parallel connection of a P- and an N-channel transistor). The number of components required is thus substantially reduced, and the delays occuring in the full adder are reduced.

The invention will be described in detail hereinafter with reference to embodiments shown in the drawings.

BRIEF DESCRIPTION OF THE FIGURES

FIG. 1 shows the construction of a section of a full-adder circuit in accordance with the invention, FIG. 2 shows an example of a logic gate for a full-adder circuit in accordance with the invention.

DESCRIPTION OF THE PREFERRED EMBODIMENT

Figure 3:
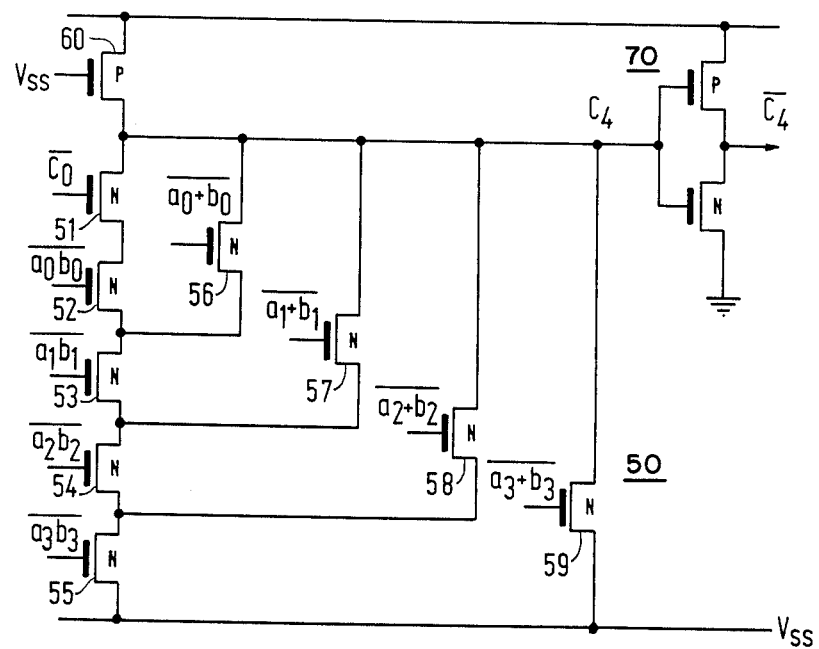
FIG. 3 shows a carry look-ahead signal circuit for a full-adder circuit in accordance with the invention.

FIG. 1 shows a section 10 for a full-adder circuit in accordance with the invention for the processing of one of the bits of the n-bit binary numbers a and b, for example bit $a_i$, $b_i$. For each bit i there is required a circuit section 10 as shown in FIG. 1. The section 10 comprises an inverting OR-gate 1 and an inverting AND-gate 3 which generate the inverted OR-signal $\overline{a_i + b_i}$ and the inverted AND-signal $\overline{a_i \cdot b_i}$. Such gate circuits are known in the state of the art. The section 10 furthermore comprises a sum circuit 20 which comprises a logic gate 5 and electronic switches 7 and 9. The logic gate 5 receives the signals $a_i$, $b_i$ and $\overline{a_i \cdot b_i}$, on the first output 11 and the second output 13 of the logic gate 5 there being generated the signals $\overline{(\overline{a_i \cdot b_i}) \cdot (a_i + b_i)}$ and $(\overline{a_i \cdot b_i}) \cdot (a_i + b_i)$ respectively, as will be described in detail hereinafter (with reference to FIG. 2). The outputs 11 and 13 are connected to a first junction 15 via the switches 7 and 9. The switches 7 and 9 are controlled by the carry signal $c_i$ and/or the inverse $\overline{c_i}$ thereof, so that on the junction 15 there is formed the sum signal $\overline{s_i}$ which is converted by an inverter 17 connected to the junction 15, into the sum signal $s_i$ on an output 19.

In order to obtain the carry signal $c_{i+1}$ and its inverse $\overline{c_{i+1}}$ which serve to control the switches in a summing section for the summing of bits of the next-higher order, the inverted OR-signal $\overline{a_i + b_i}$ and AND-signal $\overline{a_i \cdot b_i}$ are applied to a second junction 25 via switches 21 and 23. On the junction 25 there is obtained the inverted carry signal $\overline{c_{i+1}}$ which is converted into the carry signal $c_{i+1}$ on output 29 via an inverter 27.

The switches 9 and 21 are N-channel field-effect transistors which are controlled by the carry signal $c_i$, the switches 7 and 23 each being a parallel connection of an N- and a P-channel field-effect transistor whose N-channel transistor and P-channel transistor are controlled by the inverted carry signal $\overline{c_i}$ and the carry signal $c_i$, respectively.

FIG. 2 shows a logic gate 5 for a full-adder circuit 10 as shown in FIG. 1. The gate 5 is composed of complementary field-effect transistors and comprises an input section 30 and an inverter 40 which is connected to the output which is also shown in FIG. 1. The input section 30 comprises a series connection of two P-channel transistors 31, 32 which are controlled by the signals $a_i$ and $b_i$ respectively and whereto there is connected in parallel a third P-channel transistor 33 which is controlled by the inverted AND-signal $\overline{a_i \cdot b_i}$. The input section 10 furthermore comprises two parallel-connected N-channel transistors 34, 35 which are controlled by the signals $a_i$ and $b_i$ respectively and which are connected in series with a third N-channel transistor 36 which is controlled by the inverted AND-signals $\overline{a_i \cdot b_i}$. The junction of the N- and P-channel transistors 32, 33, 34, 35 forms the first output 11 of the logic gate 5 which also comprises a known inverter 40 which comprises complementary transistors 37, 38 and whose input is connected to the first output 11 while its output constitutes the second output 13 of the logic gate 5. On the first output 11 and the second output 13 there are generated the signals $\overline{(a_i \cdot b_i) \cdot (a_i + b_i)}$ and $\overline{(a_i \cdot b_i)} \cdot (a_i + b_i)$, respectively.

FIG. 3 shows a carry look-ahead signal circuit 50 for a full-adder circuit in accordance with the invention. In an n-bit full-adder circuit the circuit 50 receives the inverted OR- and AND-signals $\overline{a_i + b_i}$ and $\overline{a_i \cdot b_i}$ wherefrom a carry look-ahead signal $c_{n+1}$ can be derived. This is because:

$$\overline{c_1} = \overline{a_0 \cdot b_0} + \overline{c_0 \cdot (a_0 + b_0)} = \overline{a_0 + b_0} + \overline{c_0 \cdot (a_0 + b_0)}$$

$$\overline{c_2} = \overline{a_1 + b_1} + \overline{c_1 \cdot (a_1 \cdot b_1)}$$

$$\overline{c_3} = \overline{a_2 + b_2} + \overline{c_2 \cdot (a_2 \cdot b_2)} \text{ etc.}$$

It will be apparent from the foregoing that the carry look-ahead signal circuit 50 for the full-adder in accordance with the invention is preferably constructed with complementary field-effect transistors comprising insulated gate electrodes.

The following holds true for a four-bit carry look-ahead signal circuit. The signals $\overline{a_i + b_i}$ and $\overline{a_i \cdot b_i}$ are already generated on the outputs of the gates 1 and 3 in the circuit shown in FIG. 1, where $0 \leq i \leq 3$. The above logic formulae are realized in practice in a simple manner by applying the products $\overline{a_i \cdot b_i}$ of the bits of the input signals $a_i$, $b_i$ to the inputs of the series-connected N-channel transistors 52-55 with an ascending significance, the sums $\overline{a_i + b_i}$ of these bits being applied with an ascending significance to the N-channel transistors 56-59, each of which is connected in parallel with an each time larger section of this series connection. An inverted carry signal $\overline{c_o}$ (carry-in) is applied to the transistor 51. On the connection between the transistor 51 and a P-channel field-effect transistor 60 there is now generated the carry look-ahead signal $c_4$ which is converted, via a known inverter 70 (comprising a P- and an N-channel field-effect transistor) into an inverted carry look-ahead signal $\overline{c_4}$ which could be applied as an input signal to a subsequent cascade-connected full adder.

What is claimed is:

1. A logic full adder for adding two binary numbers a and b having n bits each, where n is equal to or greater than 2 including a plurality of single bit adders, each comprising:
   an inverting AND gate and inverting OR gate for receiving a pair of like bit numbers $a_i$ and $b_i$ and producing an inverted OR signal $\overline{a_i + b_i}$ and an inverted AND signal $\overline{a_i \cdot b_i}$ for each of said pairs of bit numbers;
   a summing circuit for producing a sum signal from each pair of said like bit numbers $a_i$ and $b_i$ comprising a logic gate which receives said like bit numbers $a_i$, $b_i$ and said inverted AND signal $\overline{a_i \cdot b_i}$, and forms on first and second outputs a first signal $\overline{a_i \cdot b_i} \cdot (a_i + b_i)$, and a second signal $\overline{a_i \cdot b_i \cdot (a_i + b_i)}$, respectively;
   a pair of electronic switches connected to receive said first and second signals, and operated in response to a carry signal $c_i$, to supply either said first signal or said second signal to a first junction; and
   a carry look-ahead circuit for generating a carry look-ahead signal from said inverted OR signals $\overline{a_i + b_i}$ and said inverted AND signals $\overline{a_i \cdot b_i}$ produced by each of said pairs of bit numbers.

2. The logic full adder of claim 1 further comprising a carry signal circuit which includes a second pair of electronic switches receiving each pair of inverted OR signals $\overline{a_i + b_i}$ and inverted AND signals $\overline{a_i \cdot b_i}$ for supplying under control of said carry signal $c_i$ either said inverted OR signal or said inverted AND signal to a second junction.

3. A logic full-adder circuit as claimed in claim 2, which full-adder circuit is constructed with complementary insulated-gate field-effect transistors, the electronic switches together comprise four N-channel field-effect transistors, a first and a second transistor thereof connecting the second and the first output, respectively of the said logic gate, to the first junction, the third and the fourth transistor connecting the output of the inverting OR-gate and the output of the inverting AND-gate, respectively, to the second junction, the first and the third transistor being controlled by the carry signal $c_i$ and the second and the fourth transistor being controlled by an inverted carry signal $\overline{c_i}$.

4. A logic full-adder circuit as claimed in claim 3, further comprising, first and second P-channel field-effect transistors, which are controlled by the carry signal $c_i$, connected in parallel with the second and the fourth transistors respectively.

5. A logic full-adder circuit as claimed in claim 3, wherein two series-connected inverters are connected to the second junction for producing on the outputs thereof a carry signal $c_{i+1}$ and the inverted carry signal $\overline{c_{i+1}}$ hving the significance i+1, respectively.

6. A logic full-adder circuit as claimed in claims 3, 4 or 5, wherein each logic gate comprises: a serious connection of two P-channel transistors which receive the bit signals $a_i$ and $b_i$, respectively, on their gate electrodes, a further P-channel transistor which is connected in parallel with the two P-channel transistors and whose gate electrode receives the inverted AND-signal $\overline{a_i \cdot b_i}$, a parallel connection of two N-channel transistors which is connected in series with the parallel connection of the P-channel transistors forming said first output, the gate electrodes of said N-channel transistors receiving the bit signals $a_i$ and $b_i$, respectively, and a further N-channel transistor which is connected in series with the two parallel-connected N-channel transistors and whose gate electrode receives the inverted AND-signal $\overline{a_i \cdot b_i}$, the logic gate also comprising an inverter which is composed of a P- and an N-channel transistor and whose gate electrode is connected to the junction of said P- and N-channel transistors which forms the first output of the logic gate, the output of the inverter forming the second output of the logic gate.

7. A logic full-adder circuit as claimed in claim 1, wherein the carry look-ahead signal circuit comprises a first series connection of transistors, gate electrodes of which receive the AND-signals $\overline{a_i \cdot b_i}$ for each of the pairs of like bit numbers with an ascending order, the transistor whose gate electrode receives the AND-signal $a_0 \cdot b_0$ of lowest order 0 being connected in series with a carry transistor whose gate electrode receives the carry signal $c_0$ having the order 0, one transistor of a plurality of transistors being connected in parallel with each section of the series connection of the carry transistor and m further transistors from said first series connection, m assuming any value from 1 to n, the gate electrode of said one transistor receiving the OR-signal $\overline{a_{m-1} + m31 \, 1}$.

8. A logic full-adder circuit as claimed in claim 7, wherein the transistors which are connected in series and in parallel in the carry look-ahead signal circuit are N-channel field-effect transistors which are connected in series with a single P-channel field-effect transistor between two power supply terminals.

* * * * *